United States Patent [19]

Takahashi et al.

[11] Patent Number: 5,839,014
[45] Date of Patent: Nov. 17, 1998

[54] IMAGE FORMING METHOD AND APPARATUS FOR COPYING IMAGES ON BOTH SIDES OF AN IMAGE FORMING MEDIUM

[75] Inventors: Toshiharu Takahashi, Kawasaki; Masako Shibaki, Yokohama; Miki Konno, Kawasaki, all of Japan

[73] Assignee: Kabushiki Kaisha Toshiba, Tokyo, Japan

[21] Appl. No.: 704,954

[22] Filed: Aug. 26, 1996

[30] Foreign Application Priority Data

Aug. 31, 1995 [JP] Japan .................................. 7-246980

[51] Int. Cl.$^6$ ........................... G03G 15/00; G03G 21/00
[52] U.S. Cl. .............................................. 399/21; 399/401
[58] Field of Search ............................. 399/21, 364, 401, 399/402

[56] References Cited

U.S. PATENT DOCUMENTS

| | | | |
|---|---|---|---|
| 4,163,897 | 8/1979 | Hubbard et al. ........................... | 235/92 |
| 4,206,996 | 6/1980 | Clark et al. ............................. | 399/21 X |
| 4,963,946 | 10/1990 | Maruta et al. ......................... | 399/402 |
| 5,095,371 | 3/1992 | Tanaka et al. ....................... | 399/364 X |
| 5,258,818 | 11/1993 | Sundquist et al. .................. | 399/364 X |
| 5,328,168 | 7/1994 | Fox ....................................... | 399/21 X |
| 5,557,391 | 9/1996 | Kato et al. .............................. | 399/401 |

FOREIGN PATENT DOCUMENTS

| | | |
|---|---|---|
| 0 005 184 | 11/1979 | European Pat. Off. . |
| 0 473 434 | 3/1992 | European Pat. Off. . |
| 0 478 354 | 4/1992 | European Pat. Off. . |

*Primary Examiner*—Fred L. Braun
*Attorney, Agent, or Firm*—Foley & Lardner

[57] ABSTRACT

A mode for sorting sheets having two sides, on which images have been printed, is performed such that sheets each having one printed side are stacked in an automatic double side device, and the sheets stacked in the automatic double side device are sequentially extracted and conveyed. If a jam takes place during extraction and conveyance of the sheets, the position, at which the jam has taken place, is displayed on an LCD display unit. After the jammed sheet has been removed, the printing operation is caused to restart. If few sheets are stacked in the automatic double side device before the printing operation is completed, a copy key is depressed to perform control to perform the printing operation once again. Also, a method for replacing the images of the sheets which are jammed during the double sided copying operation is provided.

5 Claims, 14 Drawing Sheets

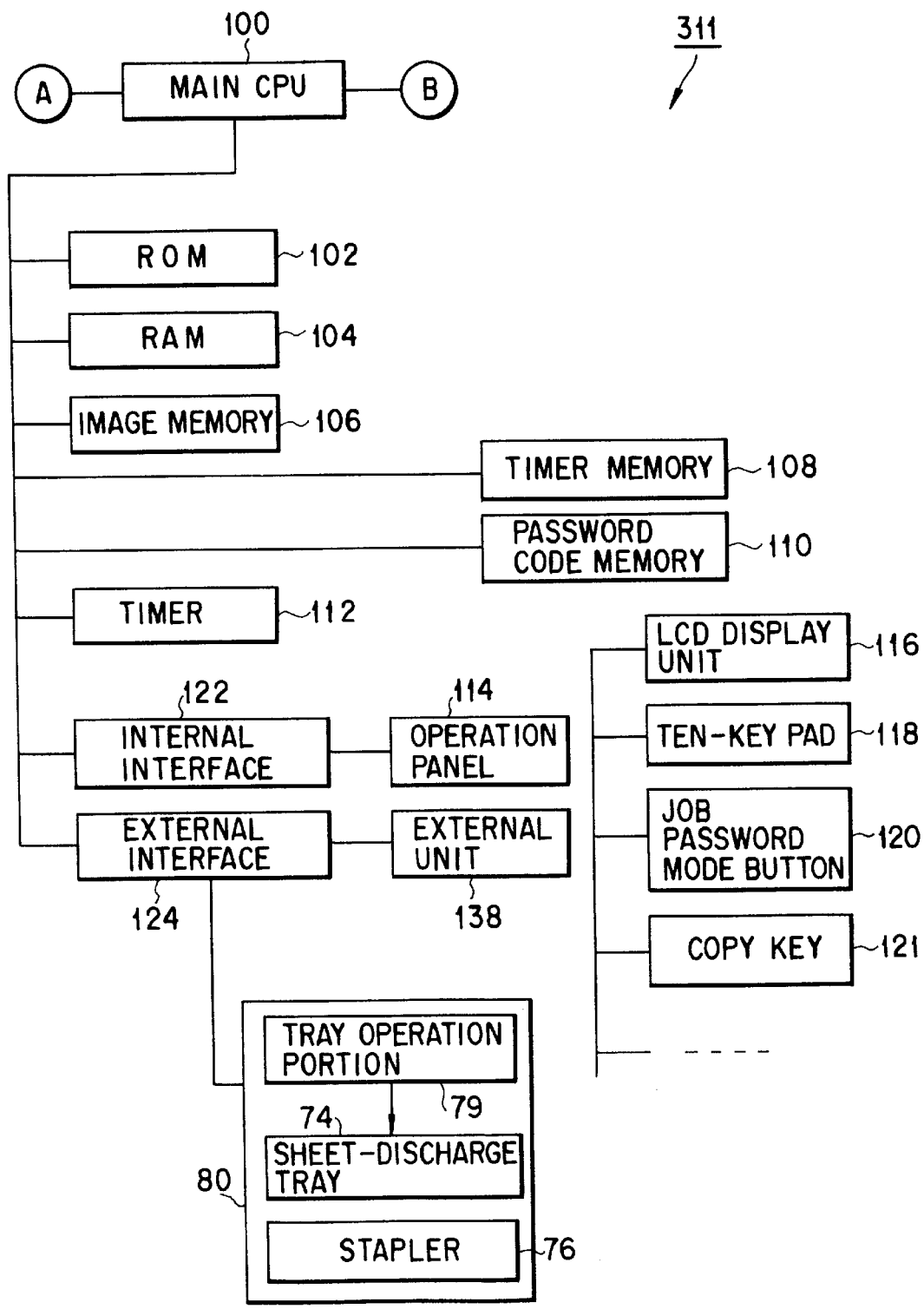
F I G. 3

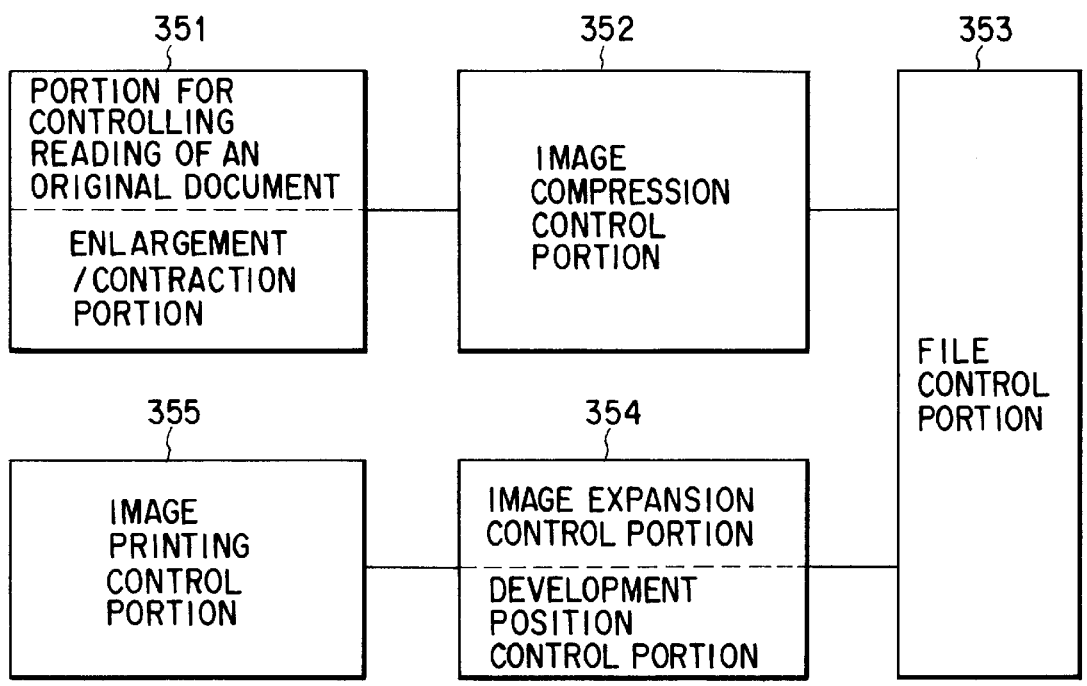
F I G. 6

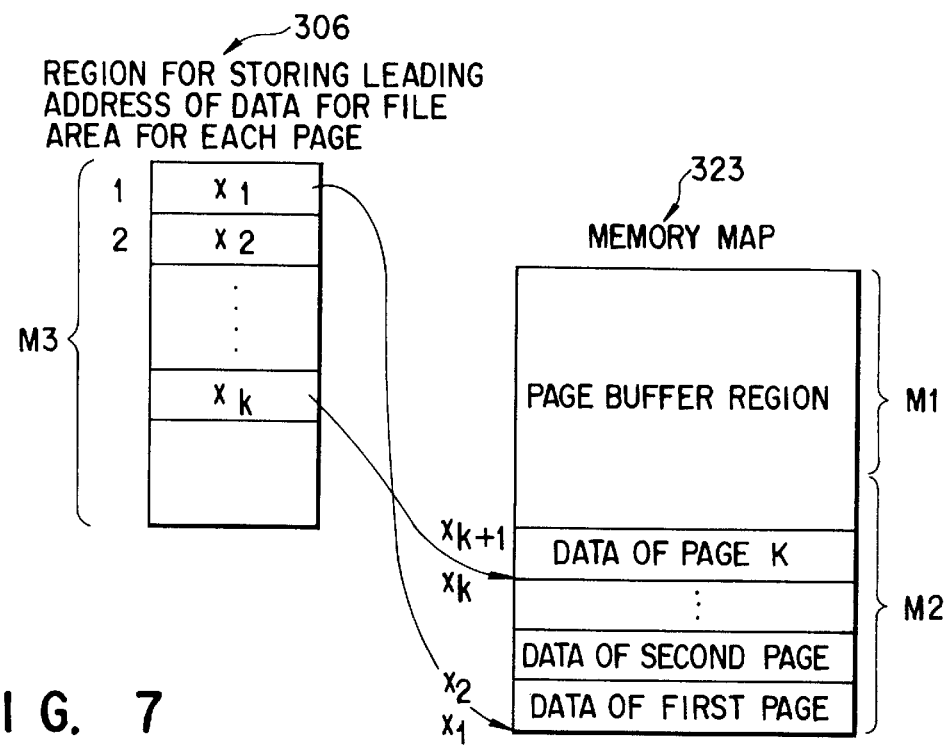
F I G. 7
F I G. 8A
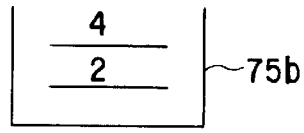
F I G. 8B
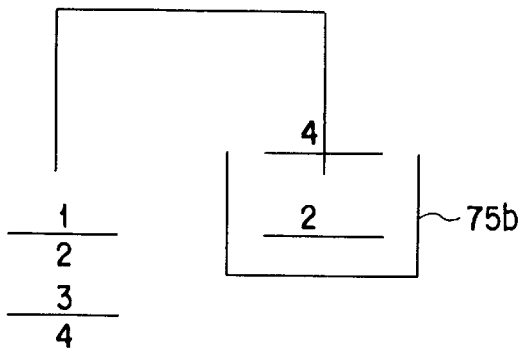
F I G. 8C
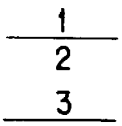

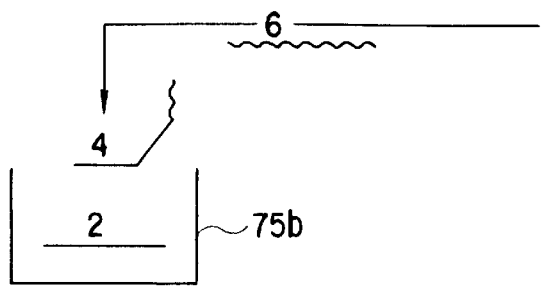
F I G. 10
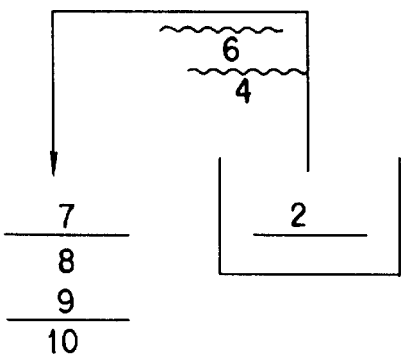
"STATE OF JAM"
F I G. 11A
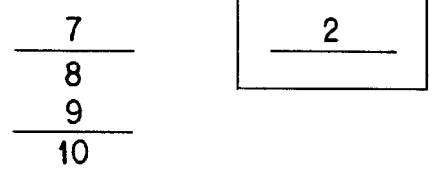
"STATE WHERE JAM HAS BEEN SOLVED"
F I G. 11B
F I G. 12A
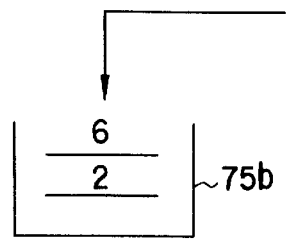
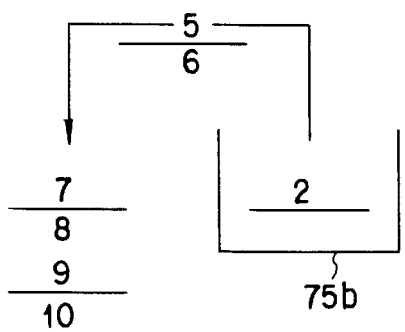
F I G. 12B
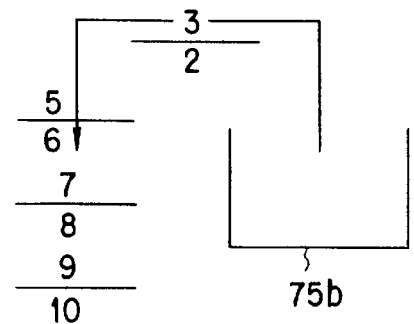
F I G. 12C

「STATE OF JAM」

「STATE WHERE JAM HAS BEEN SOLVED」

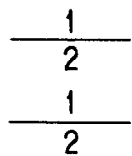 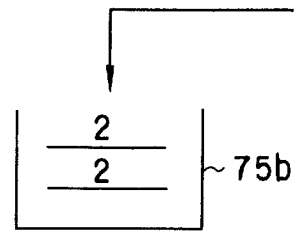
F I G. 16A
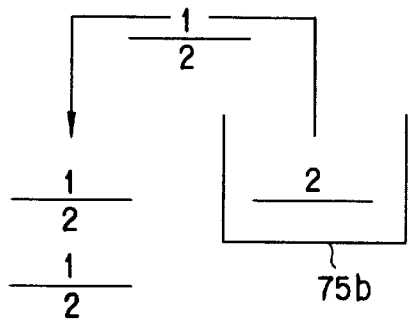
F I G. 16B
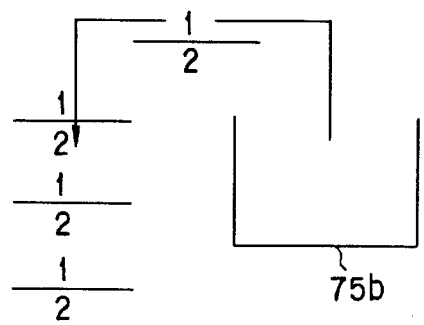
F I G. 16C
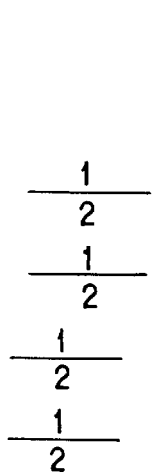 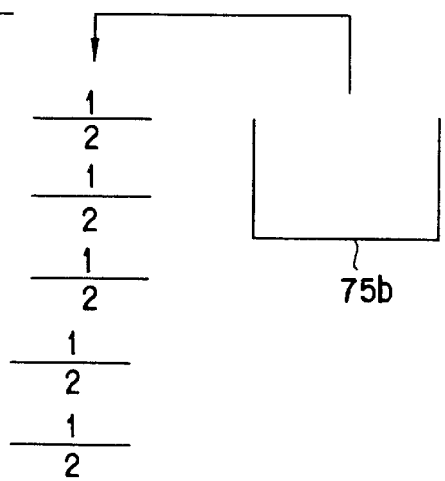
F I G. 17A      F I G. 17B

IMAGE FORMING METHOD AND APPARATUS FOR COPYING IMAGES ON BOTH SIDES OF AN IMAGE FORMING MEDIUM

BACKGROUND OF THE INVENTION

1. Field of the Invention

The present invention relates to an image forming apparatus, such as a digital copying machine, having functions of compressing and expanding an image, storing images and automatically copying images on the two sides of sheets, and to a method of forming an image.

2. Description of the Related Art

Hitherto, a digital copying machine, serving as the image forming apparatus, has been provided with a so-called memory edition and copying function capable of combining a plurality of original-document images with one another to form an image for one sheet so as to print (form) the image. Moreover, the copying machine of the foregoing type has been provided with an electronic sorting and copying function for compressing images read by a scanner and supplied from the same to store the compressed images in a page memory having file areas sectioned into areas for respective pages and then expanding and printing image data stored in the page memory.

The digital copying machine of a type having a stapler is enabled to have a staple sorting mode which is set for the purpose of stapling sheets printed and discharged due to the electronic sorting and copying function to form one or more copies of sheets.

An automatic double side device (ADD) adaptable to the digital copying machine enables double side copying to be performed such that images are printed on the two sides of the sheets by the following steps of: temporarily stacking, onto a tray, sheets having one sides (for example, reverse sides), on which images have been printed; and sequentially taking out the sheets stacked on the tray to print images on the residual sides (for example, the right sides).

In general, if a jam (a problem) takes place during the double side printing operation in a sorting mode in which a plurality of original-document sheets are printed to obtain a plurality of copies and they are divided into each copy, a user is required to remove the sheets encountered the jam and instruct the apparatus to restart the printing operation. Thus, the apparatus again prints the images for the pages, on which the image could not be printed due to the jam, to new sheets so that the printing operation is continued. However, the number of the jammed sheets which have been removed by the user and the number counted and estimated by the apparatus sometimes do not coincide with each other, thus resulting in pages being sometimes lacked.

If a jam takes place during the double side printing operation in a group mode in which an original document consisting of a plurality of sheets is printed to obtain a plurality of copies and the printed sheets are divided into groups of the same page, also the user is required to remove the sheets encountered the jam and instructs the apparatus to restart the printing operation so that the apparatus again prints the pages lacked due to the jam and continues the printing operation. However, the number of the jammed sheets which have been removed by the user and the number counted and estimated by the apparatus sometimes do not coincide with each other, thus resulting in pages being sometimes lacked.

SUMMARY OF THE INVENTION

Accordingly, an object of the present invention is to provide an image forming apparatus and an image forming method capable of compensating lacking in the printed pages after a user has removed a jammed sheet and instructed to restart the printing operation if a jam takes place during a double side printing operation in a sorting mode or a group mode.

In order to achieve the above object, according to one aspect of the present invention, there is provided an image forming apparatus comprising: means for reading image information of an original document; means for forming an image on an image forming medium in accordance with image information read by the reading means; means for conveying the image forming medium to the image forming means and conveying, to a discharge portion, the image forming medium on which the image has been formed by the image forming means; first detection means for detecting occurrence of a jam during conveyance of the image forming medium performed by the conveying means; means for interrupting the conveyance operation to be performed by the conveying means when the first detection means has detected the occurrence of the jam, so that jammed image forming mediums are removed; second detection means for detecting the number of removed image forming mediums, which have been removed after the removal operation enable due to the interruption has been completed, being larger than the number of the image forming mediums which are required to be removed; and means for automatically setting, to the image forming means, lacking image information and the number of times of image forming.

According to another aspect of the present invention, there is provided an image forming apparatus comprising: means for reading image information of an original document; means for storing a plurality of image information items read by the reading means; means for forming images on image forming mediums in accordance with image information stored in the storage means; means for conveying the image forming mediums to the image forming means, temporarily stacking, in a sheet storage portion, the image forming mediums each having first side having an image formed by the image forming means, supplying the image forming mediums to the image forming means so as to cause an image to be formed on a second side of each of the image forming mediums, and conveying the image forming mediums having the first and second sides having images formed by the image forming means to a discharge portion; first detection means for detecting occurrence of a jam during conveyance of the image forming mediums from the sheet storage portion to the discharge portion performed by the conveying means; means for interrupting the conveyance operation to be performed by the conveying means when the first detection means has detected the occurrence of the jam in order to remove jammed image forming mediums; second detection means for detecting the number of removed image forming mediums, which have been removed after the removal operation enabled due to the interruption has been completed, being larger than the number of the image forming mediums which are required to be removed; and means for controlling the conveying means and the image forming means in accordance with a result of the detection performed by the second detection means so as to read, from the storage means, image information corresponding to images formed on the image information mediums removed excessively and thus lacking so as to normally form images.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 3 is a block diagram showing the structure of a basic CPU;

FIG. 6 is a control block diagram showing an electronic sorting function of the image forming apparatus;

FIG. 7 is a diagram showing a storage region of a page memory;

FIGS. 8A to 8C are diagrams showing an operation to be performed when an original document consisting of four sheets, each having one side on which an image has been formed, is double side printed by using an automatic double side device in a sorting mode;

FIG. 10 is a diagram showing occurrence of a jam during the double side printing operation;

FIGS. 11A and 11B are diagrams showing a jam taking place due to double supply of sheets from a tray of the automatic double side device;

FIGS. 12A to 12C are diagrams showing the double side printing operation using the automatic double side device;

FIGS. 16A to 16C are diagrams showing a jam taken place due to double supply of sheets from the tray of the automatic double side device; and FIGS. 17A and 17B are diagrams showing a double side printing operation using the automatic double side device.

DETAILED DESCRIPTION OF THE PREFERRED EMBODIMENTS

A preferred embodiment of the present invention will now be described with reference to the drawings.

Figure 1:
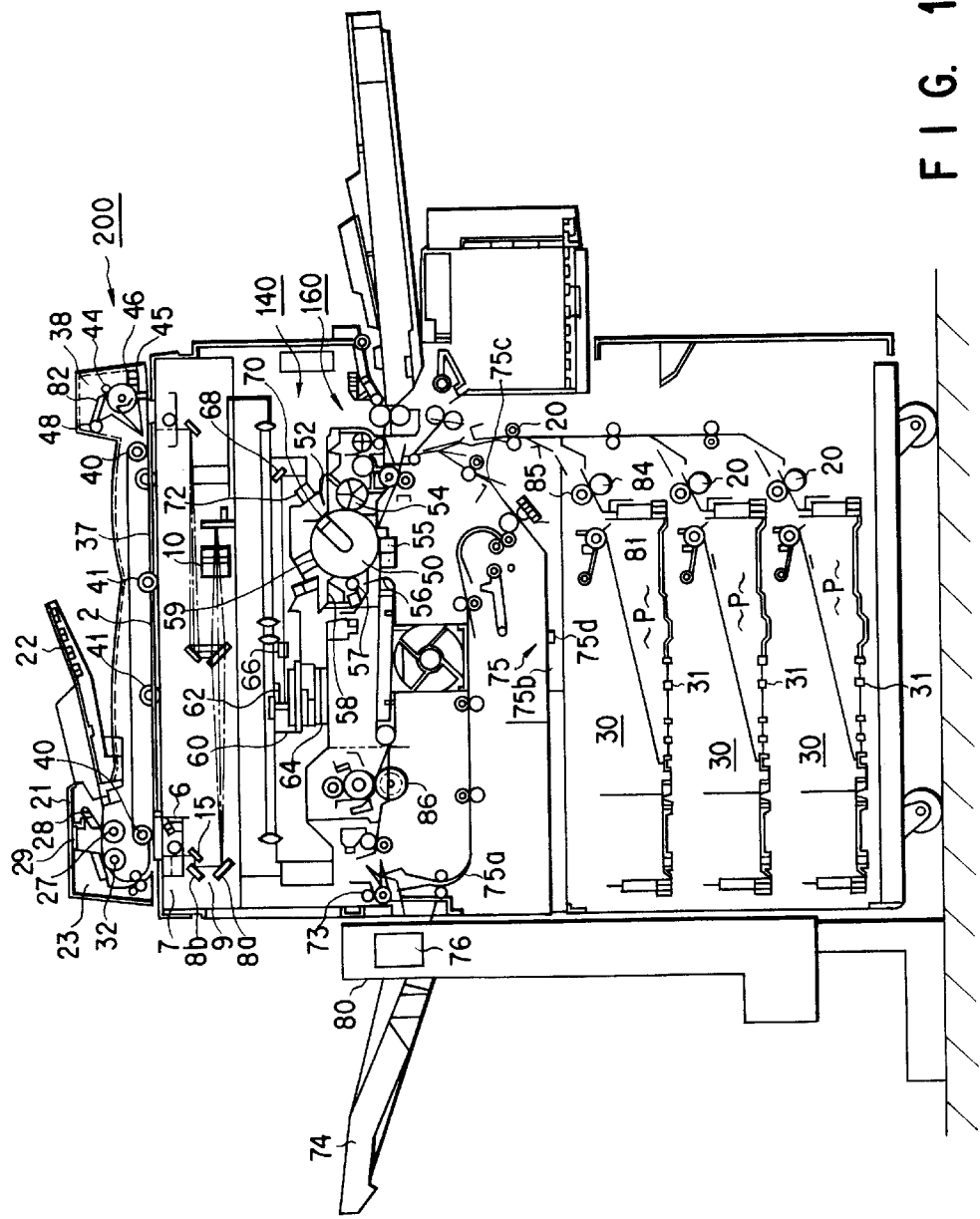
FIG. 1 is a cross sectional view showing an image forming apparatus according to an embodiment of the present invention.

FIG. 1 is a schematic diagram showing the overall structure of an electronic copying machine which is an image forming apparatus according to the present invention. The apparatus has an original-document scanning portion 140 and an image forming portion 160. An automatic original-document supply unit 200 is mounted on an upper portion of the electronic copying machine.

The automatic original-document supply unit 200 has a cover body 21 serving as the frame and having a rear end which is fastened to the rear end of the upper portion of the body of the apparatus by a hinge unit (not shown) so that the cover body 21 can be opened and closed as required. Thus, the overall body of the automatic original-document supply unit 200 can be rotated and displaced to open the upper portion of an original-document retainer 2. An original-document supply frame 22 capable of collectively holding a plurality of original-document sheets is disposed at a somewhat leftward position of the upper surface of the cover body 21. A supply means 23 for, one by one, extracting the plural original-document sheets to supply the sheets to an end (the left end of FIG. 1) of the original-document retainer 2 is disposed at an end of the apparatus. The supply means 23 has pickup rollers 27 for extracting the original document, a weight plate 28 for pressing the original document against the pickup rollers 27 and an empty sensor 29 serving as an original-document detection sensor for detecting a state where the original document is set to the original-document supply frame 22. In a direction in which the pickup rollers 27 extract the original document, sheet supply rollers 32 are disposed so that the original document sheets are sequentially supplied. An original-document conveying belt 37 covering the upper surface of the original-document retainer 2 is arranged on the upper surface of the original-document retainer 2. The original-document conveying belt 37 comprises a wide endless belt arranged between a pair of belt rollers 40 and having a white outer surface, the original-document conveying belt 37 being moved forwards or rearwards by a belt drive mechanism (not shown). On the reverse side of the inside portion of the original-document conveying belt 37, there are disposed a plurality of belt holding rollers 41 for pressing the surface of the original-document conveying belt 37 against the original-document retainer 2 and a set switch (not shown) for detecting a state where the automatic original-document supply unit 200 is opened or closed. The original document supplied by the supply means 23 is conveyed from an end (the left end) of the original-document retainer 2 to another end (the right end) of the same. A sheet-discharge means 38 is disposed in the right-hand portion of the apparatus. The sheet-discharge means 38 has conveying rollers 44, pinch rollers 45 for pressing the original document against the conveying rollers 44, a sheet discharge sensor 46 serving as an original-document detection means for detecting the rear end of the original document which is moved in a direction in which the original document is discharged. Sheet discharge rollers 48 are disposed downstream from the passage for discharging the original document. The original document discharge passage has a gate 82 for introducing the original document into the original-document retainer 2 while reversing the original document. As a result, images can be copied onto the two sides of the original document.

The original-document scanning portion 140 consists of an exposure lamp 6 serving as a light source; a first carriage 7 having a mirror 15; a second carriage 9 having mirrors 8a and 8b for warping the optical path; a lens 10; a photoelectric conversion portion 11 for receiving reflected light; a drive system (not shown) for changing the positions of the foregoing elements; and an A/D conversion portion (not shown) for converting an output from the photoelectric conversion portion 11, that is, image data from analog data to digital data. The first and second carriages 7 and 9 are connected to each other by a timing belt (not shown) and arranged in such a manner that the second carriage 9 is moved in the same direction as that of the movement of the first carriage 7 at a speed which is the half of that of the first carriage 7. As a result, scanning can be performed in such a manner that the length of the optical path to the lens 10 is made to be constant. The lens 10 has a fixed focal length and arranged to be moved in the direction of the optical axis when the magnification is changed. The photoelectric conversion portion 11 photoelectrically convert light reflected by the original document, the photoelectric conversion portion 11 being mainly composed of, for example, a CCD line image sensor. In this case, one pixel of the original document corresponds to one element of the CCD sensor. An output from the photoelectric conversion portion 11 is transmitted to the A/D conversion portion. The movement of each of the first and second carriages 7 and 9 and the mirrors 8a and 8b is performed by a stepping motor (not shown). The first and second carriages 7 and 9 are moved in accordance with the operation of a timing belt (not shown) arranged between a drive pulley (not shown) connected to a rotational shaft of the stepping motor and an idle pulley (not shown). The lens 10 is moved in the direction of the optical axis due to spiral operation of a spiral shaft (not shown) rotated by a corresponding stepping motor (not shown).

Reference numeral 60 represents an electrooptic conversion portion (a semiconductor laser unit). A collimator lens 62, a polygonal mirror (polyhedron reflecting mirror) 64, a lens 66, reflecting mirrors 68 and 70 and a lens 72 are disposed to correspond to the electrooptic conversion portion 60. Thus, a photosensitive drum 50 is irradiated with a laser beam transmitted from an exposure unit 52.

The image forming portion 160 is formed by combining, for example, a laser optical system and an electrophotographic method capable of forming an image on transfer paper. That is, the image forming portion 160 has the photosensitive drum 50 serving as an image carrier rotatively supported at substantially the central portion of the apparatus. The exposure unit 52, a development unit 54, a transference charger 55, a separation charger 56, a cleaning charger 57, a destaticizing charger 58 and a charger 59 are disposed in this sequential order around the photosensitive drum 50. The photosensitive drum 50 is uniformly charged by the charger 59. Moreover, a laser beam emitted from the original-document scanning portion 140 causes the image of the original document to be formed on the photosensitive drum 50 so that an electrostatic latent image is formed.

The electrostatic latent image formed on the photosensitive drum 50 is developed by the development unit 54. The developed image is transferred to copying paper P supplied, by the transference charger 55, from a sheet supply cassette 30 serving as a paper supply means to be described later through the resist controllers 20. The copy paper P having the image transferred by the transference charger 55 is separated by the separation charger 56 due to AC corona discharge, and then conveyed to a fixing unit 86 by the conveyance belt. The copy paper P having the developed image, which has been melted and fixed by the fixing unit 86, is discharged onto a discharge tray 74 through a sorter 80 by a pair of discharge rollers 73. The sorter 80 has a stapler 76 for stapling each set of copied sheets in a staple sorting mode.

Developer retained on the photosensitive drum 50, from which the developed image has been transferred and separated to the copy paper P, is cleaned by the cleaning charger 57. Then, the destaticizing charger 58 makes the potential of the surface of the photo-sensitive drum 50 to be lower than a predetermined level to enable a next copying operation to be performed.

When the double side copying operation for printing images on the two sides of the copy paper P is performed, the copy paper P having the developed image, which has been melted and fixed by the fixing unit 86, is conveyed through a conveyance passage 75a, and then stacked on a tray 75b. The copy paper P, each having one side on which the image has been printed, is conveyed to the transference charger 55 through a conveyance passage 75c so that developed images are transferred to the residual sides, on which no image has been printed. A light-reflecting type paper sensor 75d is disposed in the lower portion of the tray 75b to detect whether or not paper sheets have been stacked on the tray 75b.

The conveyance passage 75a, the tray 75b, the conveyance passage 75c and the paper sensor 75d form an automatic double side device (ADD) 75 serving as an automatic double side reversing mechanism.

Reference numeral 30 represents each of a plurality of sheet supply cassettes mounted vertically and serving as a sheet supply means mounted detachably from the front portion of an apparatus body 1. The sheet supply cassette 30 is in the form of a cassette case 31 which is a box accommodating the copy paper P. An extraction end of the cassette case 31 is inclined with respect to a direction in which the copy paper P is extracted. The copy paper P accommodated in the cassette case 31 of the sheet supply cassette 30 is, by pickup rollers 81, picked up and extracted in the downward direction such that the uppermost sheet is picked up first. The copy paper P, extracted by the pickup rollers 81 and conveyed to the extraction end of the cassette case 31, is separated one by one in a sheet separation portion consisting of sheet supply rollers 84 and separation rollers (or a separation pad) 85 disposed on the inside portion of an upper portion of the cassette case 31 so as to be conveyed to the image forming portion 160.

Figure 2:
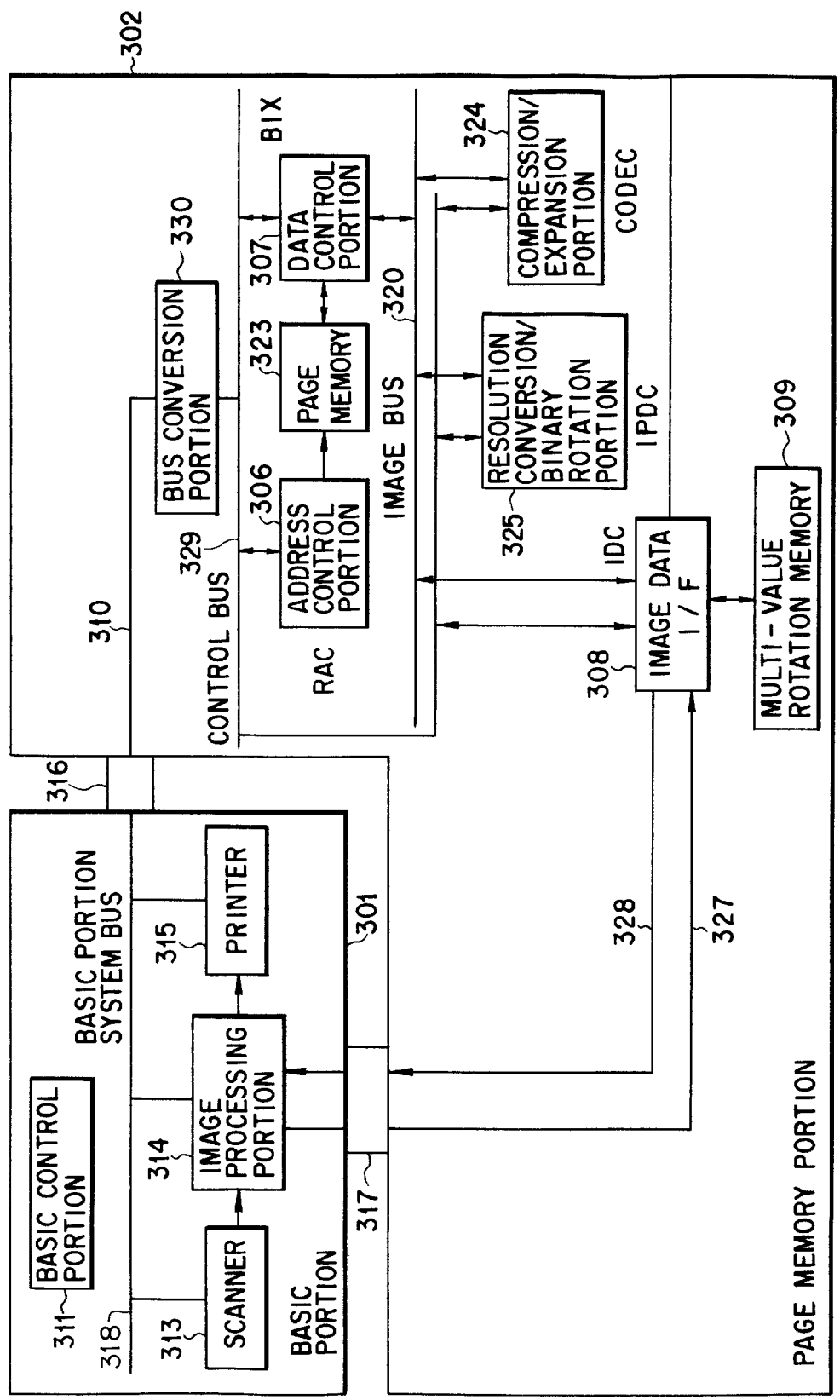
FIG. 2 is a diagram showing the system structure of the image forming apparatus.
Figure 4:
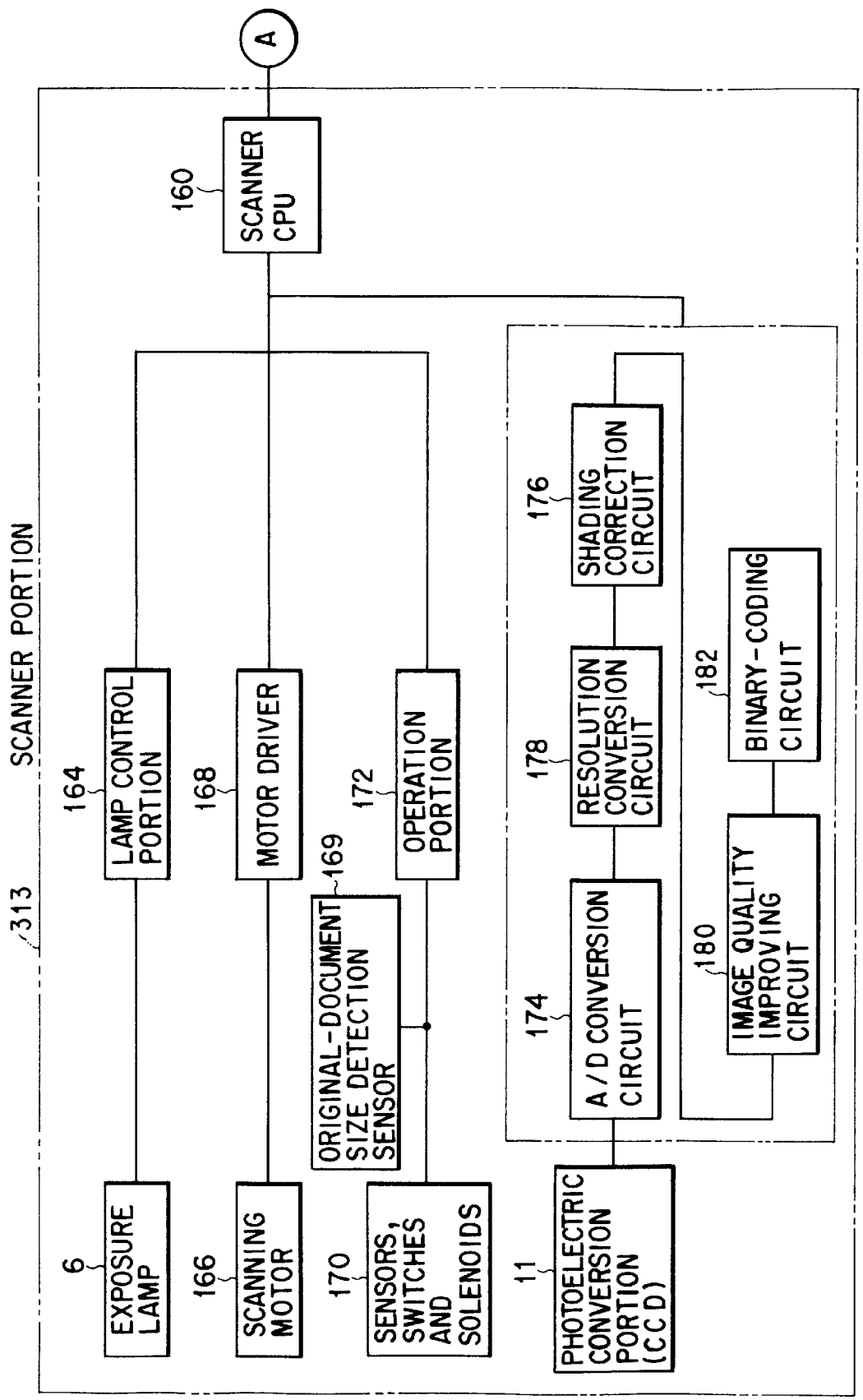
FIG. 4 is a block diagram showing the structure of a scanner portion.
Figure 5:
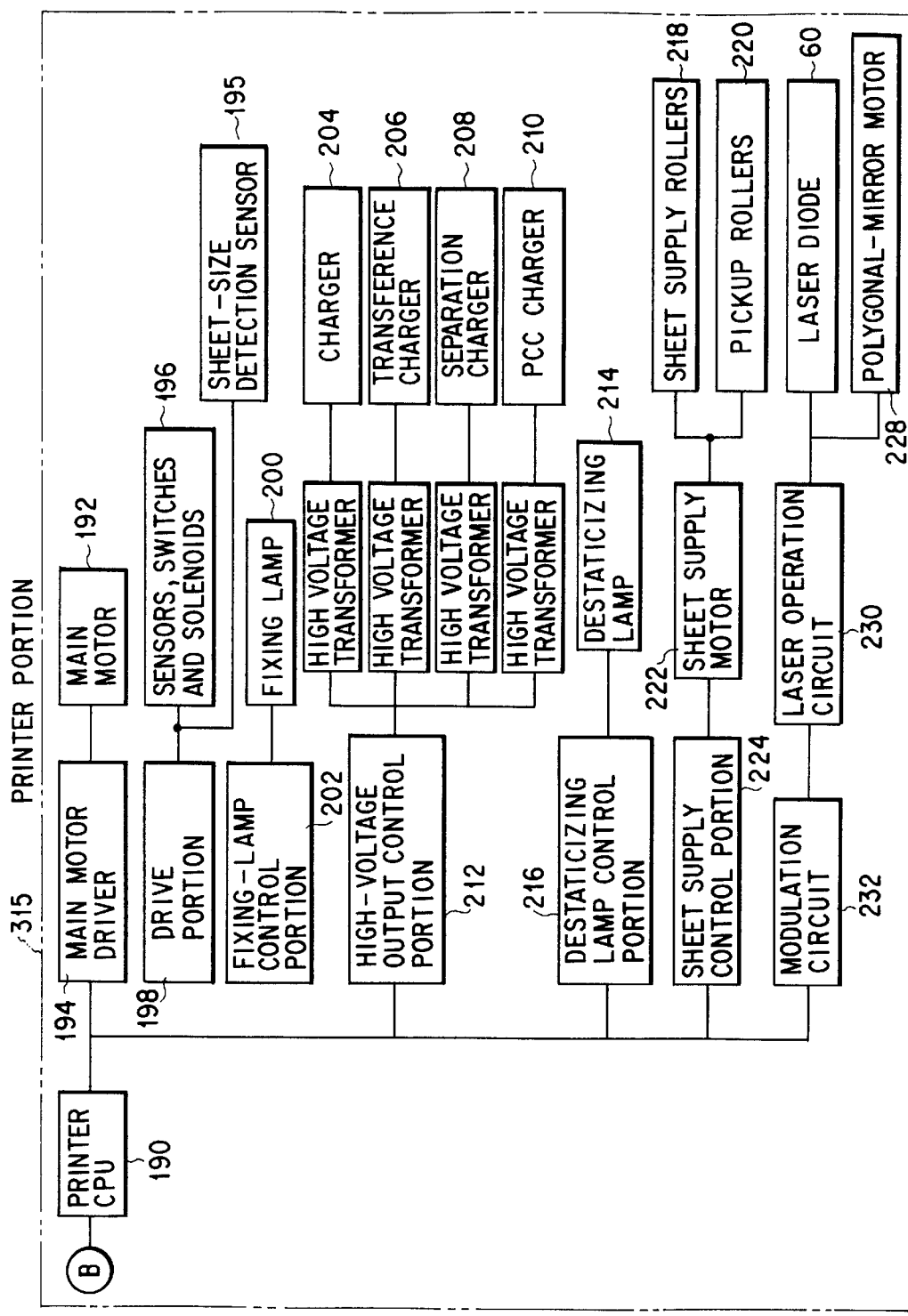
FIG. 5 is a block diagram showing the structure of a printer portion.

Referring to FIGS. 2 to 5, a control circuit for the image forming apparatus will now be described. FIG. 2 is a schematic block diagram of the image forming apparatus such as a digital copying machine control system according to the embodiment of the present invention. FIG. 3 shows a CPU portion, FIG. 4 shows a scanner portion and FIG. 5 shows a printer portion.

As shown in FIG. 2, the digital copying machine control system is composed of two blocks consisting of a basic portion 301 and a page memory portion 302. In the basic portion 301, an image processing portion 314 is connected between a scanner 313 and a printer 315 so that the digital copying machine is formed. The page memory portion 302 realizes memory copy by receiving and storing image data from the basic portion 301 and by again transferring the stored image data items to the basic portion 301.

The basic portion 301 and the page memory portion 302 are connected to each other by a basic-portion system interface 316 for communicating control data and a basic-portion image interface 317 for communicating image data.

The basic portion 301 consists of the scanner 313, the printer 315, the image processing portion 314 and a basic control portion 311 for controlling the foregoing units.

As shown in FIG. 3, a ROM 102, a RAM 104, an image memory 106, a timer memory 108, a password code memory 110, a timer 112, an internal interface 122 and an external interface 124 are connected to a main CPU 100 of the basic control portion 311. An operation panel 114 is connected to the internal interface 122. The operation panel 114 has an LCD display unit 116, a ten-key pad 118, a job password mode button 120, a copy key 121 and the like. The external interface 124 is connected to the sorter 80 and an external unit 138. A sheet-discharge tray 74 of the sorter 80 is driven by a tray operation portion 79.

In the structure formed as described above, image information is stored and read by the main CPU 100. In a case where a password code and image information are stored for example, image information read by the scanner portion under control of a scanner CPU 160 is stored in the image memory 106 to follow an instruction issued from the main CPU 100. The mode of the instruction from the main CPU 100 is determined in accordance with input (input using keys) from the operation portion.

Referring to FIG. 4, the detailed structure of the scanner portion 313 will now be described. The scanner CPU 160 of the scanner portion 313 is connected to a lamp control portion 164 for controlling an irradiation lamp 6, a motor driver 168 for controlling a scanning motor 166, an original-document size detection sensor 169 and an operation portion 186 for operating and controlling variable sensors, switches and solenoids 170 so as to control the connected elements. The scanner CPU 160 is also connected to an A/D conversion circuit 174 for processing image information supplied from the photoelectric conversion element 11, a resolution conversion circuit 178, a shading correction circuit 176, an image quality improving circuit 180 and a binary-coding circuit 182 so as to control the connected elements.

Referring to FIG. 5, the printer 315 will now be described in detail. In the printer 315, a printer CPU 190 is connected to a main motor driver 194 for rotating a main motor 192, a sheet-size detection sensor 195, drive portion 198 for controlling sensors, switches and solenoids 196, a fixing-lamp control portion 202 for controlling a fixing lamp 200, a high-voltage output control portion 212 for controlling a charger 204, a transference charger 206, a separation charger 208 and a PCC charger 210, a destaticizing lamp control portion 216 for controlling a destaticizing lamp 214, a sheet supply control portion 224 for controlling a sheet supply motor 222 for rotating sheet supply rollers 218 and pickup rollers 220 and a modulation circuit 232 for controlling a laser operation circuit 230 for the electrooptic conversion portion (a laser diode) 60 and a polygonal-mirror motor 228.

The page memory portion 302 will now be described in detail with reference to FIG. 2. The structure of a bus line 310 connected to a system bus 318 of the basic portion 301 is converted into a bus line 329 by a bus conversion portion 330. A page memory 323 temporarily stores image data, while an address control portion 306 generates address for the page memory 323. An image bus 320 is a bus line for transferring data between devices in the page memory portion 302. A data control portion 307 controls data transference when data is transferred between the page memory 323 and the other device through the image bus 320.

An image data I/F 308 interfaces image data when image data is transferred to and from the basic portion 301 through the basic-portion image interface 317. A resolution conversion/binary rotation portion 325 converts the resolution of image data to the resolution of another unit when image data is transmitted to the unit having the different resolution, converts image data received from a unit having a different resolution to the resolution of the printer 315 of the basic portion 301 and rotates binary-coded image data by an angular degree of 90 degrees.

A compression/expansion portion 324 compresses supplied image data for the devices for performing facsimile transmission or optical disc storage which compresses and transmits image data and expands image data in the compressed form to be visualized through the printer 315. A multi-value rotation memory 309 is connected to the image data I/F means 308 and operated to rotate image data by an angular degree of 90 degrees or −90 degrees so as to transmit the rotated image data when the image data is transmitted to the printer 315.

FIG. 6 is a functional block diagram showing an electronic sorting function of the image forming apparatus according to the present invention. Referring to the functional block diagram shown in FIG. 6, a portion for controlling reading an original document and enlargement/contraction portion 351 corresponds to, for example, the scanner 313 and the image processing portion 314, an image compression control portion 352 and an image expansion control portion/development position control portion 354 correspond to the compression/expansion portion 324, an image printing control portion 355 corresponds to the printer 315 and a file control portion 353 corresponds to the data control portion 307 and the like.

The portion for controlling reading an original document of the portion for controlling reading of an original document and enlargement/contraction portion 351 quantizes image data supplied from the scanner portion 313 to write the same on the page memory 323. If an original document has been set to the automatic original-document supply apparatus 200, the portion for controlling reading of an original document causes the original document to be supplied from the automatic original-document supply apparatus 200 and reads the original document correspondently. The original document set to the automatic original-document supply apparatus 200 is read such that the final page is read first. If a double side original document has been instructed, the original document is read in such a manner that the reverse side of the final page is read first, the right side of the same is read and then the right side of the leading pages read last.

The enlargement/contraction portion of the portion for controlling reading of an original document and enlargement/contraction portion 351 is a sub-module of the portion for controlling reading of an original document and arranged to determine the reduction or the enlargement ratio (hereinafter called as a "magnification") in accordance with the relationship between the sheet and the size of the original document, determines the number of longitudinal and horizontal pixels of an image to be copied and processes, that is, enlarges or reduces image data supplied from the scanner portion 313.

In the image compression control portion 352 and the file control portion 353, image data on the page memory 323 is compressed and, in a file form, written on a region to be controlled.

FIG. 7 shows the structure of the storage region of the page memory 323 which is sectioned into page buffer region MI on which image data of the original document read by the scanner portion 313 is written as it is and a file area M2 on which data formed by compressing the image data above is written and which is sectioned into regions for corresponding pages.

The leading address of each page of the file area M2 is stored in leading address storage region M3 for storing page data in each file area in the address control portion 306. Note that the file may be formed on a volatile memory, such as a RAM, or a large capacity non-volatile memory, such as a hard disk.

When an operator has set an original document to, for example, the automatic original-document supply apparatus 200 and depressed the copy key 121 to copy the original document, the portion for controlling reading of an original document and enlargement/ contraction portion 351 causes the original document to be supplied and enlarges or contracts image data obtained by reading the supplied original document. The file control portion 353 writes the image data on the page memory 323. The image compression control portion 352 compresses written image data for each page and causes the same to be stored in the file area M2 sectioned into corresponding pages. The foregoing process is performed until all of the original document sheets set to the automatic original-document supply apparatus 200 are supplied. After data of all of the original document sheets has been stored in the page memory 323, the control is performed by the image expansion control portion/development position control portion 354.

The image expansion control portion/development position control portion 354 sequentially reads, from the file area M2, the compressed images of the original document to expand the image in units of one side (the page to be output) to be output (printed), the image expansion control portion/ development position control portion 354 then transferring the expanded image to the image printing control portion 355. The foregoing process is performed until all of the original document images are read.

The sequential order of the operations of reading the compressed image data items are determined to correspond to the original document page numbers to be described later. The images are printed in the determined order, and then the printed sheets are stacked on the tray 75b of the automatic double side unit 75.

In the automatic double side unit 75, the sheets having the printed reverse sides are stacked on the tray 75b, and then the sheets are extracted from the tray 75b so that the right sides are printed. Then, the sheets having the two sides on which images have been printed are discharged onto the sheet-discharge tray 74. In a case where the original document has a plurality of sheets, the reverse side of each sheet is initially printed, and then all of the printed sheets having the printed reverse sides are stacked. Then, the right sides of the sheets are printed while being discharged from the automatic double side unit 75. Thus, the sheets having the printed two sides are discharged onto the sheet-discharge tray 74.

FIG. 8 is a diagram showing an operation to be performed when four original document sheets having images on one side thereof are printed into sheets having two printed sides. As shown in FIG. 8A, compressed data of a second page and stored in the file area M2 of the page memory 323 is initially printed on the reverse side of a first sheet under control of the data control portion 307, and then the sheet is placed on the tray 75b of the automatic double side unit 75. Then, image data of a fourth page is printed on the reverse side of the second sheet, and then stacked on the tray 75b.

Then, as shown in FIG. 8B, the sheet having the reverse side, on which the fourth page has been printed, is extracted from the tray 75b, followed by printing the third page on the right side of the sheet and discharging the same. Then, the sheet having the reverse side on which the second page has been printed is extracted from the tray 75b, followed by printing a first page on the right side of the sheet and discharging the same. When two or more copies are printed, the foregoing operation is repeated to obtain a required number of copies.

If the number of sheets of the original document is not a multiple of two, the printing operation is performed in such a manner that each page is made to advance by one to cause the reverse side of the final page to be a white page. FIG. 8C shows a case where an original document having three sheets are printed out.

Figure 9A:
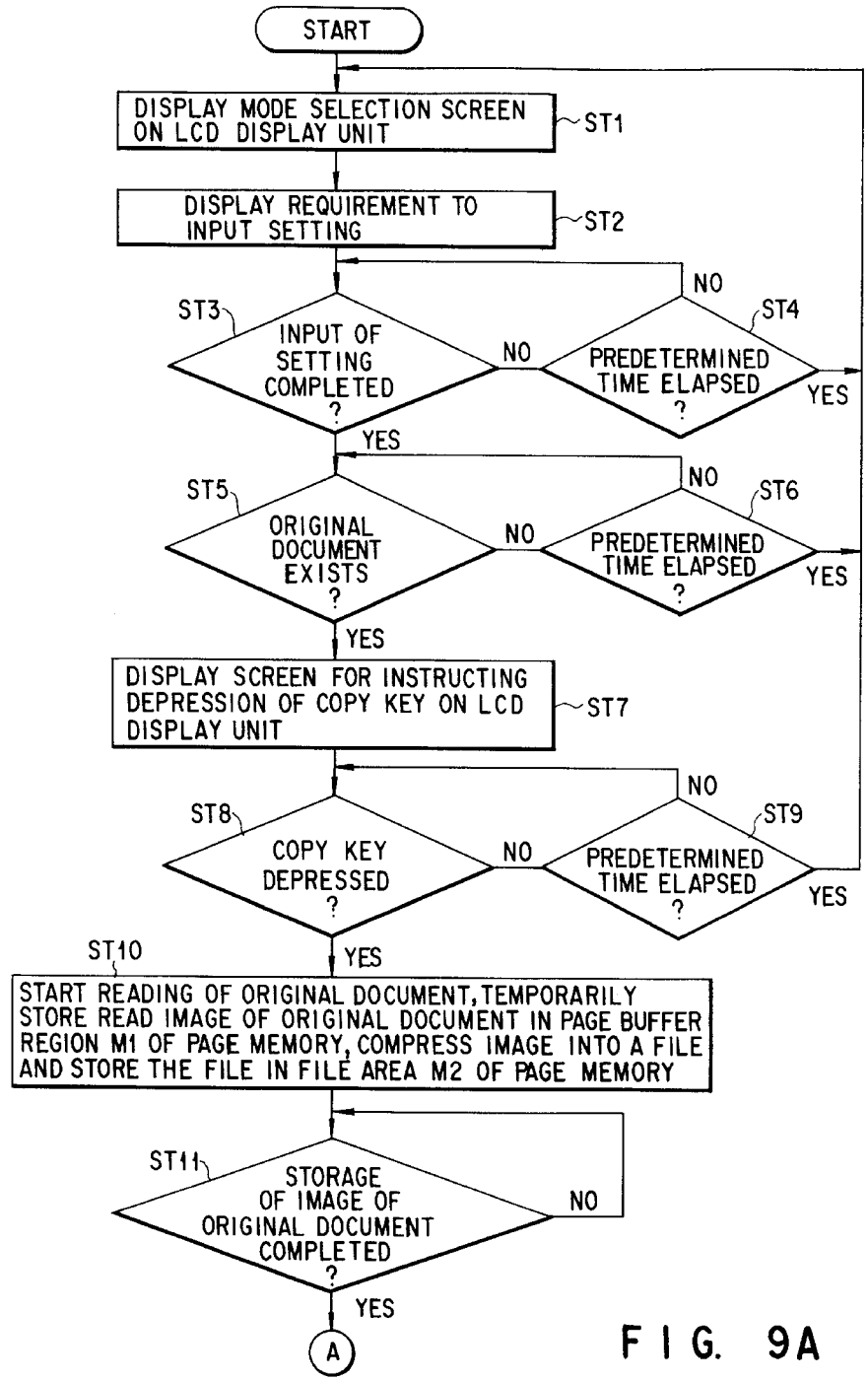
FIGS. 9A and 9B show a flow chart of an operation to be performed when a jam takes place during a double side printing operation in a sorting mode for obtaining double side printed sheets.
Figure 9B:
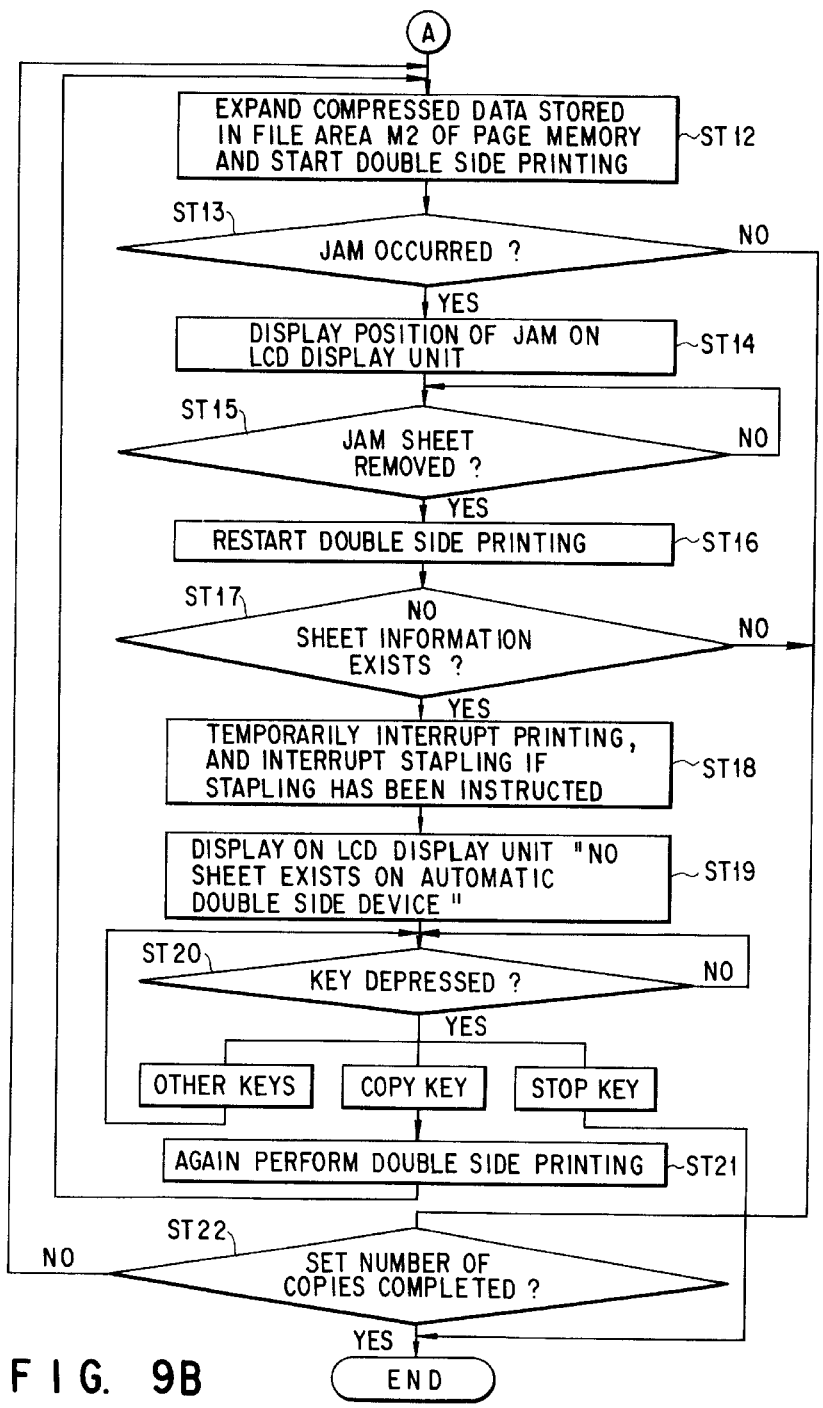

An operation to be performed if the foregoing structure encounters a jam in a sorting mode of the double side printing operation, that is, in a mode of the double side printing operation in which an original document having a plurality of sheets is printed to obtain a plurality of copies so as to be sectioned into each copy will now be described with reference to a flow chart shown in FIGS. 9A and 9B. The description will now be described about an operation to be performed when an original document consisting of ten sheets each having one printed side is double side printed and a third sheet has encountered a jam during a process in which the same is stacked on the tray 75b of the automatic double side unit 75.

When a menu has been selected due to an operation of the LCD display unit 116 performed by a user, the main CPU 100 causes a mode selection screen to be displayed on the LCD display unit 116 (ST1).

When the sorting mode of double side printing displayed on the selection screen of the LCD display unit 116 has been selected and depressed, the main CPU 100 causes the LCD display unit 116 to display a requirement to set the number of required copies (ST2).

After setting (for example, a required number of copies of three) has been performed by the operator (ST3), the main CPU 100 checks whether an original document exists on the automatic original-document supply apparatus 200 in accordance with a detection signal supplied from the empty sensor 29 or checks whether an original document exists on the original-document retainer 2 in accordance with a detection signal supplied from a sensor (not shown) (ST5). If an original document exists, the main CPU 100 causes an instruction to depress the copy key 121 to be displayed on the LCD display unit 116 (ST7). An assumption is performed here that an original document exists on the automatic original-document supply apparatus 200. If the setting operation is not completed after a predetermined period time has elapsed in step ST3, or if an original document is not set after a predetermined period of time has elapsed in step ST5, the flow proceeds to step ST2.

After the copy key 121 has been depressed by the operator (ST8), the main CPU 100 causes the automatic original-document supply apparatus 200 to start supplying the original document. The scanner 313 scans (reads) the supplied original document to temporarily store the same in the page buffer region MI of the page memory 323. The compression/expansion portion 324 compresses image data in the page buffer region MI to form the same into a file, and then stores the file in the file area M2 of the page memory 323 (ST10).

After the compression/expansion means 324 has stored the image of the original document in the file area M2 of the page memory 323 (ST11), the compression/expansion portion 324 expands compressed data of the original document formed into the file stored in the file area M2 of the page memory 323. Then, the double side printing operation by the printer 315 starts under control of the image processing portion 314 (ST12).

If a jam takes place during a process in which a third sheet is stacked on the tray 75b of the automatic double side unit 75 in the case where the original document having ten sheets is double side printed, the sheet on which the sixth page of the original document has been printed encounters a jam, as shown in FIG. 10. Since the forward sheet (the sheet on which the fourth page has been printed) or the next sheet (a sheet on which the eighth page has been printed) is jammed on the sheet conveyance passage depending upon the jam generation timing, the user is required to remove the jammed sheets additionally.

In general, a user is able to detect sheet jam positions in accordance with jam positions displayed on the LCD display unit 116 of the operation panel 114 and remove the non-required sheets (jammed sheets). Also the main CPU 100 is able to determine the sheets correctly stacked on the automatic double side unit 75 or the sheets discharged from the automatic double side unit 75 in accordance with information supplied from a sheet existence detection sensor (not shown) disposed on the sheet conveyance passage.

Since a jam of a type, for example, in which two stacked sheets are unintentionally conveyed results in the user removing the two sheets, the actual number sometimes does not coincide with the number counted in accordance with the control program of the main CPU 100.

FIG. 11A shows a case where a sheet, on which a sixth page has been printed, and a sheet, on which a fourth page has been printed, are jammed due to double supply of sheets from the tray 75b of the automatic double side unit 75. If a jam takes place (ST13), the main CPU 100 detects the position at which a jam of a sheet has taken place in accordance with information supplied from a detection sensor (not shown) and causes the LCD display unit 116 of the operation panel 114 to display the position of the jam (ST14). In this case, generation of the jam at a discharge port of the automatic double side unit 75 is displayed. Note that generation of a jam is detected such that sheets do not interrupt light detection to be performed by optical sensors disposed at predetermined positions.

The user removes the two sheets in accordance with the display of a jam at the discharge port of the automatic double side unit 75 on the LCD display unit 116 (ST15). However, the main CPU 100 considers that only the sheet on which the sixth page of the original document has been printed is removed, and then restarts the double side printing operation (ST16). A state where the jam has been solved when the printing operation has been started is shown in FIG. 11B.

Therefore, the main CPU 100, as shown in FIG. 12A, temporarily prints the sixth page, and then stacks the sixth page on the tray 75b of the automatic double side unit 75. Then, as shown in FIG. 12B, the main CPU 100 causes a sheet to be discharged from the tray 75b of the automatic double side unit 75 to print the right side of the sheet. Then, the main CPU 100 causes the fifth page and the third page of the original document to be printed. When a sheet is intended to be supplied from the automatic double side unit 75 to print the first page as shown in FIG. 12C, information indicating that no sheet exists is obtained from the paper sensor 75d (ST17). Thus, a determination can be performed that the first copy cannot be printed correctly and, thus the printing operation is interrupted. If the stapling mode has been instructed, the sheets are not stapled, and then the sheets are discharged (ST18).

Then, the main CPU 100 causes the LCD display unit 116 of the operation panel 114 to display "No sheet exists in the automatic double side unit" (ST19). When the user has depressed the copy key 121 to instruct continuation of the copying operation (ST20), the main CPU 100 causes the two sides of the first copy (consisting of five sheets) to be again printed and discharged (ST21). In a case where a plurality of copies are sort-printed, the residual copies successively are printed (ST22). If setting that three copies are required has been performed, the two residual copies are successively printed.

If the user depresses a stop key (not shown) on the operation panel 114 in place of depressing the copy key 121, the main CPU 100 completes the printing operation and deletes compressed data of the original document stored in the file area M2 of the page memory 323. If the user depresses another key (not shown) except the stop key on the operation panel 114 in place of depressing the copy key 121, the main CPU 100 makes the key depression to be invalid.

Figure 13A:
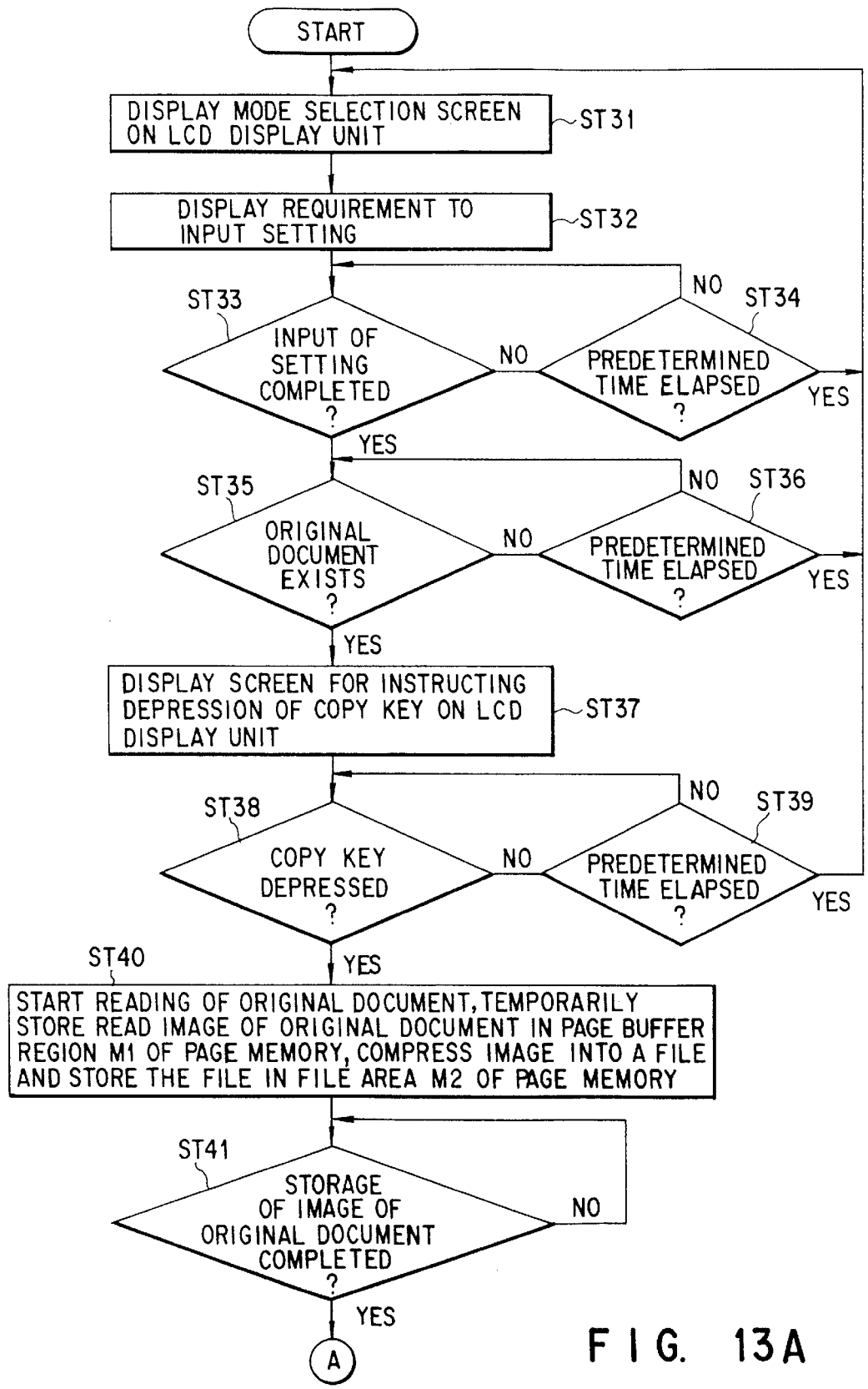
FIGS. 13A and 13B show a flow chart of an operation to be performed when a jam takes place during a double side printing operation in a group mode.
Figure 13B:
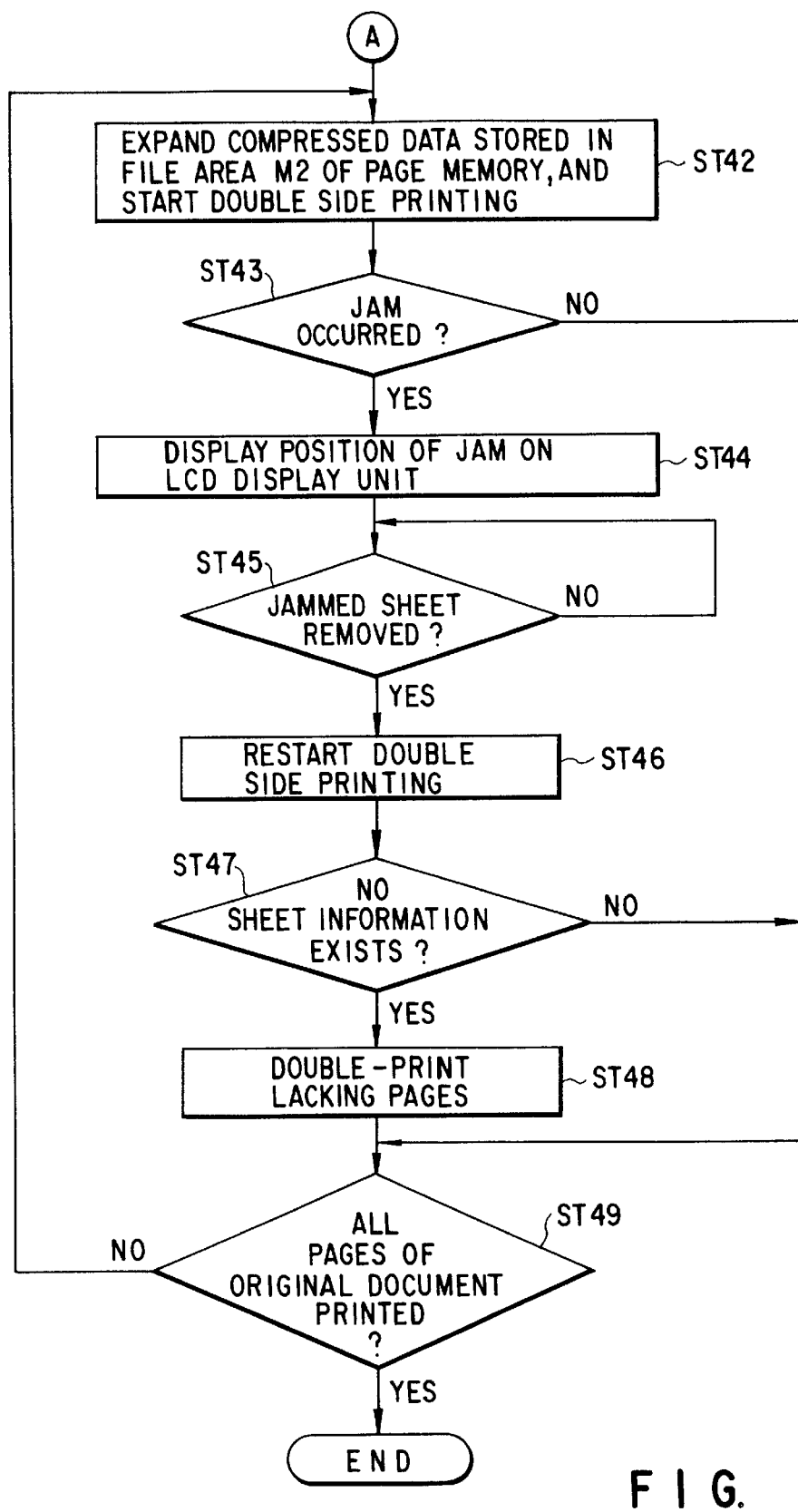

An operation to be performed when a jam takes place during a double side printing operation in a group mode in which an original document having a plurality of pages is printed and the printed sheets are divided for each of the same pages will now be described with reference to a flow chart shown in FIGS. 13A and 13B.

When a menu has been selected by a user who has operated the operation panel 114, the main CPU 100 causes the LCD display unit 116 to display the mode selection screen (ST31). When a group mode of the double side printing on the selection screen of the LCD display unit 116 has been selected and depressed, the main CPU 100 causes the LCD display unit 116 to display a requirement to set the number of required copies (ST32).

After setting (for example, a required number of copies of three) has been performed by the operator (ST33), the main CPU 100 checks whether an original document exists on the automatic original-document supply apparatus 200 in accordance with a detection signal supplied from the original-document detection sensor 29 or checks whether an original document exists on the original-document retainer 2 in accordance with a detection signal supplied from a sensor (not shown) (ST35). If an original document exists, the main CPU 100 causes an instruction to depress the copy key 121 to be displayed on the LCD display unit 116 (ST37). An assumption is performed here that an original document exists on the automatic original-document supply apparatus 200.

After the copy key 121 has been depressed by the user (ST38), the automatic original-document supply apparatus 200 starts supplying the original document. Then, the scanner 313 scans (reads) the supplied original document to temporarily store the same in the page buffer region MI of the page memory 323. Then, the compression/expansion portion 324 compresses image data in the page buffer region MI to form the same into a file, and then stores the file in the file area M2 of the page memory 323 (ST40).

After the compression/expansion means 324 has stored the original document in the file area M2 of the page memory 323 (ST41), the compression/expansion means 324 expands compressed data of the original document formed into the file stored in the file area M2 of the page memory 323. Expanded data is supplied to the printer 315 through the image processing portion 314 so that the double side printing operation starts (ST42).

FIG. 16 shows control to be performed in a case where a copying operation is performed in the group mode. In the group mode, the same image is repeatedly printed until instructed number of copies are obtained.

Figure 14A:
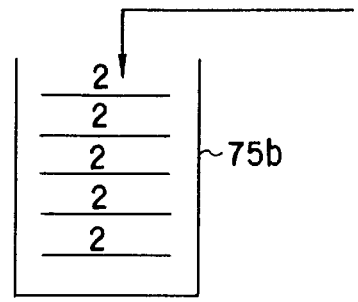
FIGS. 14A and 14B are diagrams showing control to be performed when a copying operation in the group mode is performed.
Figure 14B:
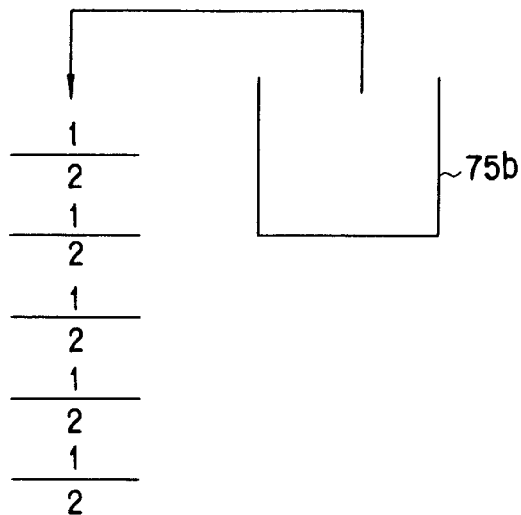

In a case where an original document having two sheets is double side printed, the main CPU 100 causes the second page of the original document to be printed by the number of times corresponding to the instructed number of copies and causes the printed sheets to be stacked on the tray 75b of the automatic double side unit 75, as shown in FIG. 14A. After the stacking operation has been completed, the main CPU 100 causes the sheet, on which the second page has been printed, to be discharged from the conveyance passage 75a of the automatic double side unit 75 so that the first page is printed, as shown in FIG. 14B.

Similarly to the sorting mode, in the group mode, the number of sheets removed by the user sometimes does not coincide with the number of sheets counted in accordance with the control program of the main CPU 100.

Figure 15A:
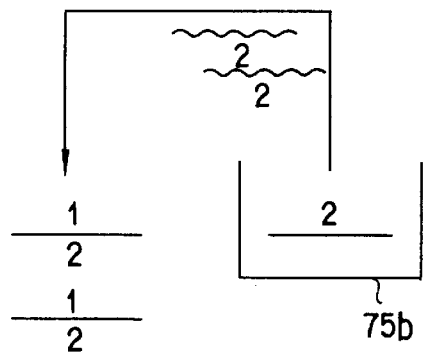
FIGS. 15A and 15B are diagrams showing a jam taken place due to double supply of sheets from the tray of the automatic double side device.

FIG. 15A shows a case where a sheet, on which the third sheet of the original document supplied from the tray 75b of the automatic double side unit 75 has been printed, and a sheet, on which a fourth sheet of the same has been printed, have been jammed due to double supply of sheets. If a jam takes place (ST43), the main CPU 100 detects the position of the jam in accordance with information supplied from the detection sensor (not shown) and causes the LCD display unit 116 of the operation panel 114 to display the position of the jam (ST44). In this case, generation of the jam at the discharge port of the automatic double side unit 75 is displayed.

Figure 15B:
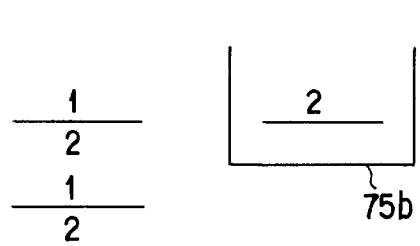

The user confirms the display of the jam taken place at the discharge port of the automatic double side unit 75 and removes the two sheets (ST45). However, the main CPU 100 considers that only the sheet having the third sheet printed thereon has been removed, and restarts the following printing operation (ST46). A state where the jam has been solved when the printing operation is caused to restart is shown in FIG. 15B.

Therefore, the main CPU 100 prints data for the third sheet, which has been temporarily removed, on a sheet and stacks the sheet on the tray 75b of the automatic double side unit 75, as shown in FIG. 16A. Then, the main CPU 100 discharges a sheet from the tray 75b of the automatic double side unit 75 and prints the first page, as shown in FIG. 16B. Then, the main CPU 100 prints the third and fourth sheets. When the main CPU 100 intends to supply a sheet from the automatic double side unit 75 to print the fifth sheet as shown in FIG. 16C, information indicating no sheet is obtained from the paper sensor 75d (ST47). Thus, the main CPU 100 determines that the sheet corresponding to the fifth sheet lacks.

Accordingly, the main CPU 100 prints the omitted sheet (ST48). As shown in FIG. 17A, the second page is printed by one and stacked on the tray 75b of the automatic double side unit 75. Then, as shown in FIG. 17B, a sheet is successively discharged from the tray 75b and the first page is printed to compensate the omitted page. If the pages of the original document which have not been printed exist, the pages are printed in the group mode to obtain the copies by the instructed number (ST49).

As described above, according to the embodiment of the present invention, copies can correctly be printed even if a user removes sheets supplied double in a case where a jam takes place during a double side printing operation in a sorting mode or a group mode using an automatic double side unit and/or if a jam takes place due to double supply of sheets.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An image forming apparatus for copying images on both sides of image forming mediums, respectively, comprising:

means for reading image information of a set of originals;

means for storing the image information read by said reading means;

means for forming images on the image forming mediums, respectively, using the image information stored in said storing means;

means for conveying the image forming mediums to said image forming means and, after images are respectively formed on first surfaces of the image forming mediums and images are respectively formed on second surfaces of the image forming mediums, conveying the image forming mediums to a discharge portion;

first detection means for detecting occurrence of a jam condition during conveyance of the image forming mediums which is performed by said conveying means;

means for displaying the occurrence of the jam condition in response to detection by said first detection means;

second detection means for detecting whether a jammed image forming medium has been removed;

third detection means for detecting whether or not the image forming mediums having the first surfaces on which the images have been formed are short in number, when an image forming operation is performed on the second surfaces of the image forming mediums; and controlling means for controlling, when said third detection means detects that the image forming mediums are short in number, said image forming means such that said image forming means performs an image forming operation using the image information stored in said storing means, in accordance with a shortage of the image forming mediums.

2. An image forming apparatus for copying images on both sides of image forming mediums, respectively, comprising:

means for reading image information of a set of originals;

means for storing the image information read by said reading means;

means for forming images on the image forming mediums, respectively, using the image information stored in said storing means;

means for conveying the image forming mediums to said image forming means and, after images are respectively formed on first surfaces of the image forming mediums and on second surfaces of the image forming mediums, conveying the image forming mediums to a discharge portion;

means for setting a sorting mode for printing the set of originals by a plurality of copies and dividing the printed sheets into each copy;

first detection means for detecting occurrence of a jam condition during conveyance of the image forming mediums which is performed by said conveying means;

means for displaying the occurrence of the jam condition in response to detection by said first detection means;

second detection means for detecting whether a jammed image forming medium has been removed;

third detection means for detecting whether or not the image forming mediums having the first surfaces on which the images have been formed are short in number, when an image forming operation is performed on the second surfaces of the image forming mediums; and means for instructing said conveying means and said image forming means to perform an image forming operation for the corresponding copy once again, using the image information stored in said storing means, in accordance with a result of detection by said third detection means.

3. An image forming apparatus for copying images on both sides of image forming mediums, respectively, comprising:

means of reading image information of a set of originals;

means for storing the image information read by said reading means;

means for forming images on the image forming mediums, respectively, in accordance with the image information stored in said storing means;

means for conveying the image forming mediums to said image forming means and, after the images are respectively formed on first surfaces of the image forming mediums and then on second surfaces of the image forming mediums, conveying the image forming mediums to a discharge portion;

means for setting a group mode for printing the set of originals by a plurality of copies and dividing the printed sheets in units of the same page;

first detection means for detecting occurrence of a jam condition during conveyance of the image forming mediums which is performed by said conveying means;

means for displaying the occurrence of the jam condition in response to detection by said first detection means;

second detection means for detecting that a jammed image forming medium has been removed; and third detection means for detecting whether or not the image forming mediums having the first surfaces on which the images have been formed are short in number, when an image forming operation is performed on the second surfaces of the image forming mediums; and means for instructing said conveying means and said image forming means to perform an image forming operation for a shortage of the image forming mediums, using the image information stored in said storing means, in accordance with a result of detection by said third detection means.

4. An image forming apparatus for copying images on both sides of image forming mediums, respectively, comprising:

means for reading image information of a plurality of originals;

means for storing the image information read by said reading means;

means for forming images on image forming mediums, respectively, in accordance with the image information stored in said storing means;

means for setting one of a sorting mode for printing the set of originals by a plurality of copies and dividing the printed originals into each copy, and a group mode for printing the set of originals by a plurality of copies and dividing the printed sheets in units of the same page;

means for conveying the image forming mediums to said image forming means, temporarily stacking the image forming mediums in a sheet storage portion after the images are respectively formed on first surfaces of the image forming mediums, conveying said image forming mediums from the sheet storage portion to said image forming means, and then conveying the image forming mediums to a discharge portion after the images are formed on second surfaces of the image forming mediums;

first detection means for detecting occurrence of a jam condition during the conveyance of the image forming mediums from the sheet storage portion to the discharge portion, which is performed by said conveying means, means for displaying the occurrence of the jam condition in response to detection by said first detection means;

second detection means for detecting that a jammed image forming medium has been removed;

third detection means for detecting whether or not the image forming mediums having the first surfaces on which the images have been formed are short in number, when said conveying means picks up the image forming mediums from the sheet storage portion after an image forming operation has been performed on the first surfaces of the image forming mediums; and means for controlling said conveying means and said image forming means such that an image forming operation is performed, in accordance with a result of detection by said third detection means and corresponding to a shortage of the image forming mediums, wherein said controlling means includes:

means for instructing said conveying means and said image forming means to perform the respective operations for the corresponding copy once again using the image information stored in said storing means, if the sorting mode has been selected by said setting means; and means for instructing said conveying means and said image forming means to perform an image forming operation for the shortage of said image forming medium, using the image information stored in said storing means, if the group mode has been selected by said setting means.

5. A method for forming images on both sides of image forming mediums, respectively, comprising the steps of:

reading image information of a plurality of originals;

storing the image information read by said reading means in a memory;

conveying image forming mediums to said image forming means and, after images are respectively formed on first surfaces of the image forming mediums and then images are respectively formed on second surfaces of the image forming mediums, conveying the image forming mediums to a discharge portion;

detecting occurrence of a jam condition during conveyance of the image forming mediums;

displaying the occurrence of the jam condition in accordance with detection in said detecting step;

detecting that a jammed image forming medium has been removed; and detecting that the image forming mediums having the first surfaces on which the images have been formed are short in number, when an image forming operation is performed on the second surfaces of the image forming mediums; and performing an image forming operation using the image information stored in said memory, and in accordance with a shortage of the image forming mediums.

* * * * *